Figure 1:
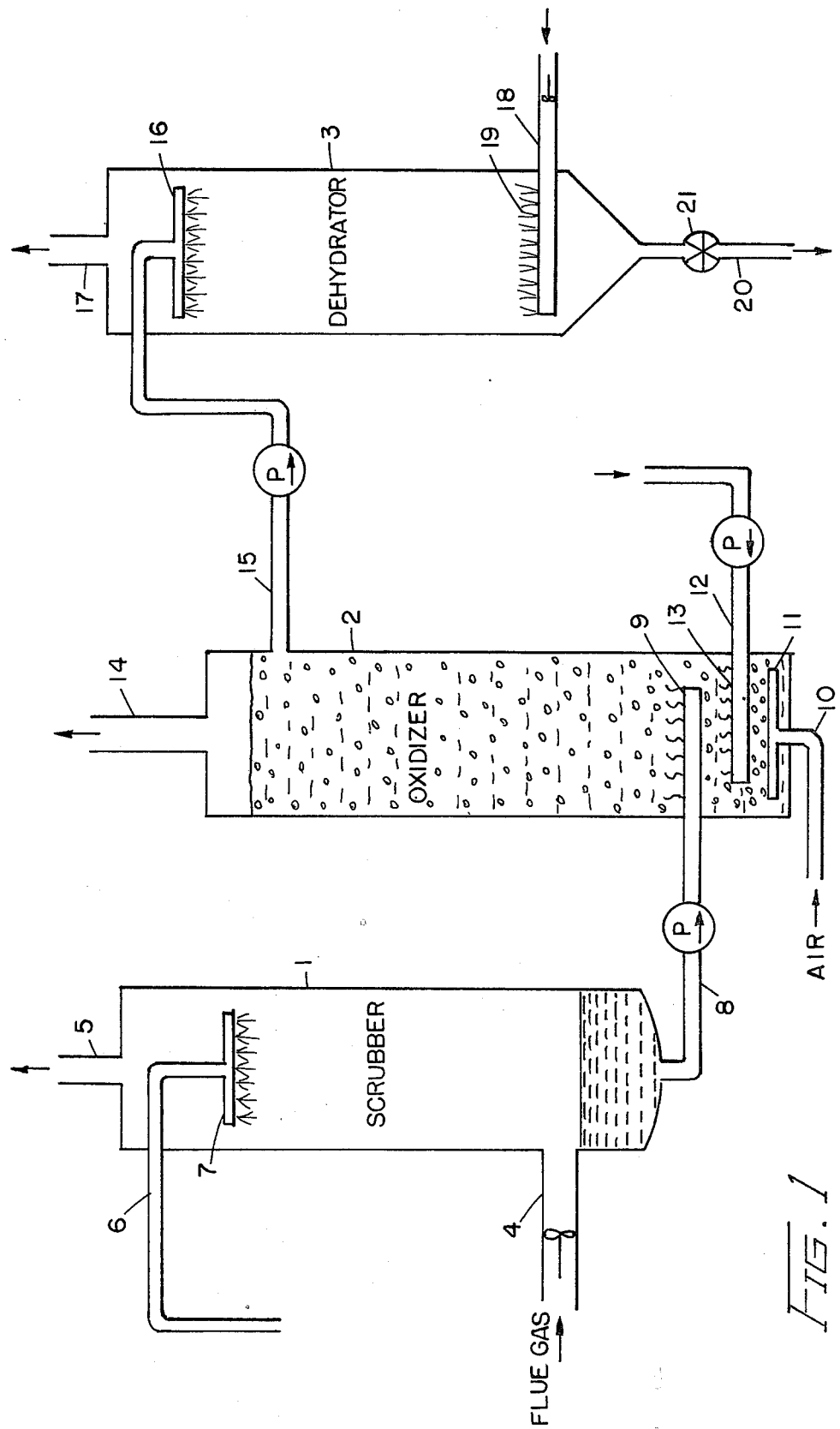

United States Patent [19]

Lurie

[11] 4,382,010

[45] May 3, 1983

[54] DESULFURIZATION OF FLUE GASES WITH COMPLETE SULFITE OXIDATION

[76] Inventor: David Lurie, 539 Covington Pl., Wyckoff, N.J. 07481

[21] Appl. No.: 170,702

[22] Filed: Jul. 21, 1980

Related U.S. Application Data

[60] Division of Ser. No. 973,897, Dec. 28, 1978, Pat. No. 4,307,069, which is a continuation-in-part of Ser. No. 688,133, May 20, 1976, Pat. No. 4,134,961, and Ser. No. 904,329, May 9, 1978, Pat. No. 4,202,869.

[51] Int. Cl.$^3$ .......................... C01F 7/10; C01F 7/76; C01D 5/00
[52] U.S. Cl. .................................. 252/184; 423/117; 423/119; 423/128; 423/551; 423/556
[58] Field of Search ................ 252/184; 423/117, 119, 423/128, 193, 242, 551, 556, 600

[56] References Cited

U.S. PATENT DOCUMENTS

| | | | |
|---|---|---|---|
| 1,538,837 | 5/1925 | Moxham | 423/119 |
| 2,055,283 | 9/1936 | Fiske et al. | 423/117 |
| 2,099,360 | 10/1937 | Yonemura et al. | 423/119 |
| 2,152,597 | 3/1939 | Lurie | 423/117 |
| 2,189,179 | 2/1940 | Park | 423/117 |
| 2,869,984 | 1/1959 | Spence | 423/119 |

*Primary Examiner*—Irwin Gluck
*Attorney, Agent, or Firm*—Evans Kahn

[57] ABSTRACT

Flue gas containing sulfur dioxide is purified (and the sulfur content thereof is recovered in elemental form) by scrubbing the gas with aqueous sodium aluminate-sodium hydroxide solution thereby forming an underflow suspension consisting essentially of sodium and aluminum sulfites and sulfates and fly ash; oxidizing the sulfites to sulfates; evaporating the free water present; reducing the resulting apparently dry mixture of sodium and aluminum sulfates by the action of reactive hydrogen and a carbonaceous reducing agent thereby forming a solid mixture of a sodium oxide and sodium aluminate and a gaseous mixture comprising sulfur dioxide, sulfur, and hydrogen sulfide; condensing said sulfur; and inter-reacting said sulfur dioxide and hydrogen sulfide to provide elemental sulfur. The solid mixture is dissolved in water to regenerate the scrubbing solution, which is then recycled. The solution is filtered at any convenient point to remove fly ash and any other solids present.

4 Claims, 2 Drawing Figures

DESULFURIZATION OF FLUE GASES WITH COMPLETE SULFITE OXIDATION

This is a division of application Ser. No. 973,897 filed on Dec. 28, 1978, Pat. No. 4,307,069 which is a continuation-in-part of my applications Ser. Nos. 688,133 and 904,329, respectively filed on May 20, 1976 and May 9, 1978, now respectively U.S. Pat. Nos. 4,134,961 and 4,202,869.

FIELD OF THE INVENTION

The present invention relates to the desulfurization of flue gas having a content of sulfur dioxide. The invention includes certain of the process steps involved, a novel composition of matter useful as raw material for the preparation of the scrubbing solution used in the process, and the over-all process performed in cyclic manner with recovery of the sulfur content of the flue gas in elementary form.

BACKGROUND OF THE INVENTION

In the United States, the supply of high-grade fossil fuel (coal and oil) of low sulfur and of high heat content is limited and costly, and power plant operators and other large producers of energy are now turning to high-sulfur fuels in place thereof. However, in the absence of special precautions, such fuels generally cannot be burned lawfully in urban areas because they release excessive quantities of sulfur dioxide. National clean air standards limit sulfur dioxide emissions to low values to prevent excessive pollution of the atmosphere. Smelters of sulfide ores face similar constraints.

It is now possible to desulfurize flue gases adequately to meet these standards, but the processes presently used for this purpose are complex and costly; moreover, they generally do not recover the sulfur in economically useful form. Economic recovery of sulfur is an important consideration, because even a moderately-sized (million kilowatt) electrical power plant operating on coal of moderate (3%) sulfur content of moderate (12,500 B.T.U./lb.) fuel value releases about 480 tons of sulfur dioxide (equivalent to about 240 tons of elemental sulfur) per day.

It has been proposed to desulfurize flue gases by an alkalized alumina process wherein a raw absorbent solid in the form of small spheres of dawsonite [NaAl(CO$_3$)(CH)$_2$] is activated at 1,200° F., to form a high-porosity, high surface area sodium aluminate. The dawsonite reacts with the sulfur dioxide in the flue gas to form sulfates which are then converted to aluminates in the presence of a reducing gas at 1,200° F. A process of this type is described in "Control Techniques for Sulfur Oxide Air Pollutants" (U.S. Dept. of Health, Education and Welfare, Washington, D.C., January 1969); see also U.S. Pat. Nos. 3,551,093 and 3,580,702 and U.S. Department of the Interior (Bureau of Mines) report "Process Development in removing sulfur Dioxide from Hot Flue Gases (1) Bench-Scale Experimentation" by D. Bienstock et al. The process has serious disadvantages in that it requires the formation and use of friable spheres which are difficult to manufacture and which have a comparatively short life. Furthermore, the report states that the absorptive capacity of "sodium alumina" for sulfur dioxide is a function of its sodium content.

Most of the other processes convert the sulfur dioxide content of flue gases to calcium sulfate sludge. This, however, creates a serious disposal problem for the sludge, and in addition results in loss of the valuable sulfur.

In the processes of my said copending applications the foregoing disadvantages are avoided by scrubbing the flue gas with an aqueous sodium aluminate-sodium hydroxide solution thereby removing substantially all of the sulfur oxides from the gas and converting the scrubbing solution into an aqueous solution of sodium and aluminum sulfates and sulfites, evaporating at least half the water from the solution, reducing the sulfates and sulfites to sodium and aluminum sulfides, and hydrolyzing the sulfides thereby regenerating the absorption solution, which can then be recycled. Sulfur dioxide and hydrogen sulfide are evolved in the steps leading to the regeneration, and the sulfur is recovered in elemental form by interaction of the two gases.

The process of the present application is an improvement over the foregoing.

The present invention principally rests on the discoveries that the removal of sulfur dioxide from flue gas can be accomplished in simpler and more economical manner when the sodium and aluminum sulfites which are formed in the scrubbing solution of my parent application are oxidized to sulfates while in said solution; that on completion of the oxidizing step the resulting mixture of sulfates can be recovered in apparently dry form containing more or less water of hydration as may be desired; that when the reduction step of my parent application is performed in the presence of reactive hydrogen, the mixture is reduced to a mixture of sodium aluminate and sodium oxide in one step with evolution of the sulfur content of the mixture in gaseous form thereby permitting ready recovery of elementary sulfur therefrom; and that the scrubbing solution used in the first step of the process can be readily regenerated by dissolving the sodium aluminate-sodium oxide mixture in water, whereby the process is rendered cyclic.

Accordingly, the invention in part is an improvement in the process for the desulfurization of a flue gas having a content of sulfur dioxide, wherein said gas is scrubbed with an aqueous solution having a dissolved content of sodium aluminate and sodium hydroxide in about 1:1 to 2:1 and preferably about 1.1:1 Na$_2$O:Al$_2$O$_3$ equivalent molar ratio thereby removing substantially all of said sulfur dioxide from said gas and converting said scrubbing solution into a spent suspension which contains sodium and aluminum sulfates and sulfites, the improvement consisting in oxidizing substantially all of said sulfites to sulfates while said sulfites are in said suspension.

The invention is further a process for the desulfurization of flue gas having a content of sulfur dioxide with recovery of the sulfur content of said gas in elementary form, which comprises scrubbing said flue gas with an aqueous scrubbing solution containing NaAlO$_2$ and NaOH in 1:1 to 2:1 Na$_2$O:Al$_2$O$_3$ molar ratio thereby removing substantially all of said sulfur dioxide from said gas and converting said scrubbing solution into a spent solution containing sodium and aluminum sulfites and sulfates; oxidizing substantially all of said sulfites to sulfates in said solution; evaporating substantially all of the free water in said solution thereby providing an apparently dry well oxidized mixture consisting essentially of sodium and aluminum sulfates; reducing said mixture with a carbonaceous reducing agent in the presence of reactive hydrogen thereby forming a solid mixture comprising a sodium oxide and sodium aluminate and a gas comprising hydrogen sulfide, sulfur, and sulfur dioxide; selectively condensing said sulfur from said gas; recovering the gas comprising hydrogen sulfide and sulfur dioxide which remains; and converting the sulfur content of said remaining gas to elemental form.

The invention still further is a cyclic process for the desulfurization of a flue gas having a content of sulfur dioxide with recovery of the sulfur content of said gas as elemental sulfur, which comprises scrubbing said flue gas with an aqueous scrubbing solution containing sodium aluminate and sodium hydroxide in 1:1 to 2:1 $Na_2O:Al_2O_3$ molar ratio thereby removing substantially all of the said sulfur dioxide from said gas and converting said scrubbing solution into a spent solution containing sodium and aluminum sulfites and sulfates; oxidizing substantially all of said sulfites to sulfates; evaporating substantially all of the free water in said solution thereby providing a mixture consisting essentially of sodium and aluminum sulfates; reducing said mixture with a carbonaceous reducing agent in the presence of reactive hydrogen thereby forming a mixture comprising sodium oxide and sodium aluminate and a gas comprising hydrogen sulfide and sulfur dioxide which remains; inter-reacting said hydrogen sulfide and said sulfur dioxide thereby forming elemental sulfur; dissolving said sodium oxide and said sodium aluminate in water thereby forming a scrubbing solution; and recycling said scrubbing solution to said scrubbing step.

The apparently dry, well oxidized mixture of sodium and aluminum sulfates referred to above preferably contains these salts in the molar equivalent ratio of about 1.1:1 because in this ratio a slight excess of sodium sulfate is present which, after reduction, provides a sufficient amount of alkali for stabilization purposes while permitting the sodium aluminate to function substantially to full advantage as absorbent. The mixture preferably contains at least ¼ of its normal water of hydration because at least this amount of water is needed during the reduction reaction as a source of reactive hydrogen.

In the sulfite oxidation step, free oxygen is the preferred oxidizing agent and air is preferred as the source thereof for reasons of economy. The oxidation medium will advantageously contain any one or a mixture of catalysts which promote oxidation of the sulfite anion by oxygen. The watersoluble ferrous and ferric salts are suitable for the purpose, and ferrous and ferric sulfates are preferred since they do not introduce extraneous anions into the system.

In the solids recovery step, the amount of water of hydration which is removed should be that which renders the product most useful in the next step of the process. Thus, when the mixture of salts is to be shipped to a central chemical processing plant, most of the normal water of hydration may advantageous be removed for the purpose of decreasing the bulk of the material to be transported. On the other hand, when the mixture is to be processed in apparatus close at hand, it will usually be more advantageous not to evaporate more than about ¾ of the normal water of hydration so as to leave enough bound water in the mixture to provide a sufficient amount of reactive hydrogen for conversion of a preponderant proportion of the sulfur content of the sodium and aluminum sulfates into hydrogen sulfide.

In the reduction step, coal (preferably in powdered form) is the preferred carbonaceous reducing agent because of its cheapness, but fuel oil, coke and natural gas can also be used. Preferably the amount of reactive hydrogen supplied by the fuel and by the water associated with the sodium and aluminum sulfates is sufficient so that the molar ratio of the hydrogen sulfide to the sulfur dioxide in the gas discharged from the reduction furnace is about 2:1.

The process of the present invention, in its preferred embodiments, provides the following advantages.

1. The spent scrubbing solution, after discharge from the oxidizing tower, is substantially free of water-soluble sulfites, thereby decreasing the risk of premature evolution of sulfur dioxide.

2. The solids discharged from the dehydration step consist essentially of an apparently dry, particulate, freeflowing mixture of sodium and aluminum sulfates. The process thus makes it practical to perform the subsequent chemical steps of the process in a central chemical plant, relieving the operators of the power generating plant (or smelter) from becoming involved in the chemical regeneration steps.

3. All of the combined sulfur in the spent, oxidized scrubbing solution is volatilized in a single step, thereby simplifying the collection and processing of the sulfur values.

4. No metal sulfides are formed in the process. Regeneration of the scrubbing solution is accomplished merely by dissolving pre-formed sodium aluminate and sodium oxide in water, and evolution of hydrogen sulfide does not occur in this step.

5. The only solid effluent from the process is elemental sulfur, which is a valuable non-toxic industrial raw material, and the gaseous discharge from the system meets present-day sulfur dioxide tolerance limits.

6. Substantially all of the thermal requirements of the process (except for the reduction step) are supplied by the sensible heat of the raw flue gas.

The process of the present invention can be performed in a number of different kinds of apparatus with appropriate modifications, the apparatus and the steps performed therein being in each instance selected or predetermined to produce the results which are set forth herein. The process involves the interaction of many independent variables, so that numerical limitations cannot be given for each instance.

It is convenient to perform the first three principal steps of the process (the scrubbing, the sulfite oxidation, and the drying steps) in separate apparatus. This permits each piece of apparatus to be designed for its specific purpose and to be operated independently of the others to its maximum advantage.

Where three towers are employed, the flue gas to be purified and the scrubbing solution are admitted separately to a scrubbing tower, which may be of conventional design, the scrubbing solution being sprayed downwardly from the top of the tower and the flue gas being admitted to the bottom of the tower, so that the flue gas and the droplets of the scrubbing solution are in counter-current turbulent flow. The flue gas and the scrubbing solution are each admitted at moderate temperature so that little evaporation of the water content of the droplets takes place and so that therefore substantially all of the sodium sulfate, aluminum sulfate and sodium sulfite which form when the absorbents in the droplets react with the sulfur dioxide in the gas remain dissolved when the spent scrubbing solution exits from the bottom of the tower. The aluminum sulfite is difficulty soluble in water, and therefore is normally present in the droplets of spent scrubbing solution in finely divided suspended state.

The purified flue gas exits from the scrubbing tower and is monitored to record the presence of sulfur dioxide therein. The presence of sulfur dioxide (and/or sulfur trioxide) in the exiting flue gas in excess of the local established tolerance limit therefor is evidence that the scrubbing is not complete and that the rate of admission of the scrubbing solution or the concentration of scrubbing solids in the solution should be increased, or other similar corrective action taken.

In the second tower, the spent scrubbing solution is subjected to the action of an oxidizing agent for sulfites until oxidation of the sodium and aluminum sulfites therein to the respective sulfates is substantially complete. It is preferable to admit the spent scrubbing solution and the oxidizing agent as separate streams to the bottom of a tower filled with the solution, the oxidizing agent being admitted, if a gas, in the form of fine bubbles so that the scrubbing solution and the bubbles rise to the top of the tower in continuous concurrent flow. The solution exiting from the top of the tower is monitored to determine whether any unoxidized sulfite is present therein. When an affirmative analysis for this material is reported, a portion of the solution at the top of the tower is bled off and is reintroduced into the bottom of the tower, or the amount of oxidizing agent is increased, until once again analysis shows that the discharged solution contains substantially no sulfites. The discharge from the oxidation tower is essentially an aqueous solution of sodium sulfate and aluminum sulfate in 1:1 to 2:1 $Na_2O:Al_2O_3$ equivalent molar ratio (142:342 to 284:342 weight ratio, water of hydration not being considered), and is transferred directly to the next tower for the solids recovery (dehydration) step.

The dehydration step is performed by removing substantially all of the free water in the spent scrubbing solution following completion of the oxidizing step. If desired, all or part of the water of hydration (the "bound" water) which is associated with the sulfates can also be removed. The two forms of water can be removed by several methods employed consecutively, but it is preferred to remove all of the free water (and as much bound water as may be desired) in a single step at atmospheric pressure employing hot raw flue gas (or air indirectly heated by the hot raw flue gas) as the drying medium. It is preferred to limit the dehydration step so that the sulfates discharged from this step are apparently dry yet contain a sufficient amount of bound water to provide enough reactive hydrogen for formation of a desirablely large proportion of hydrogen sulfide during the reduction step. For this purpose it is preferable to limit the dehydration step so that not more than ¾ (weight basis) of the water of hydration is removed.

The underflow from the dehydrator can be shipped by any convenient means to a central chemical plant for performance of the reduction step and the steps which follow thereafter, and this is a preferred procedure. If desired, however, the underflow can be charged directly into an adjacent reduction furnace; when the underflow is dry and particulate, it can be transported by gravity. In either event the mixture of salts (the underflow) is charged into a reducing furnace and is there subjected to the action, at a reducing temperature, of a suitable reducing medium in the presence of a sufficient amount of active hydrogen to convert at least a part of the sulfur content of the sulfates into hydrogen sulfide form, whereby the sulfates are reduced to sodium oxide and sodium aluminate as solids, and hydrogen sulfide, sulfur and sulfur dioxide are given off in gaseous form.

The gaseous mixture evolved from the reduction furnace is cooled to permit selective condensation of the elemental sulfur therein which is recovered in liquid state, and the residual gas is treated according to the Claus process (modified to accommodate variations in the hydrogen sulfide:sulfur dioxide ratio therein) to inter-react these components to form elementary sulfur and water, the sulfur being recovered likewise in liquid form.

The solid discharge from the reducing furnace is principally sodium oxide, sodium aluminate, fly ash and the residue of any catalytic material which may have been added to the oxidation solution. This mixture is passed into a dissolving tank to regenerate the scrubbing solution after which the solution is filtered to remove the fly ash and any other insoluble materials which may be present.

The filtrate is recycled to the scrubbing tower, thereby completing the cycle.

The solids from the reducing furnace are advantageously cooled before they are charged into the dissolving tank to permit the regenerated scrubbing solution to be discharged from the dissolving tank at moderate temperature.

Figure 2:
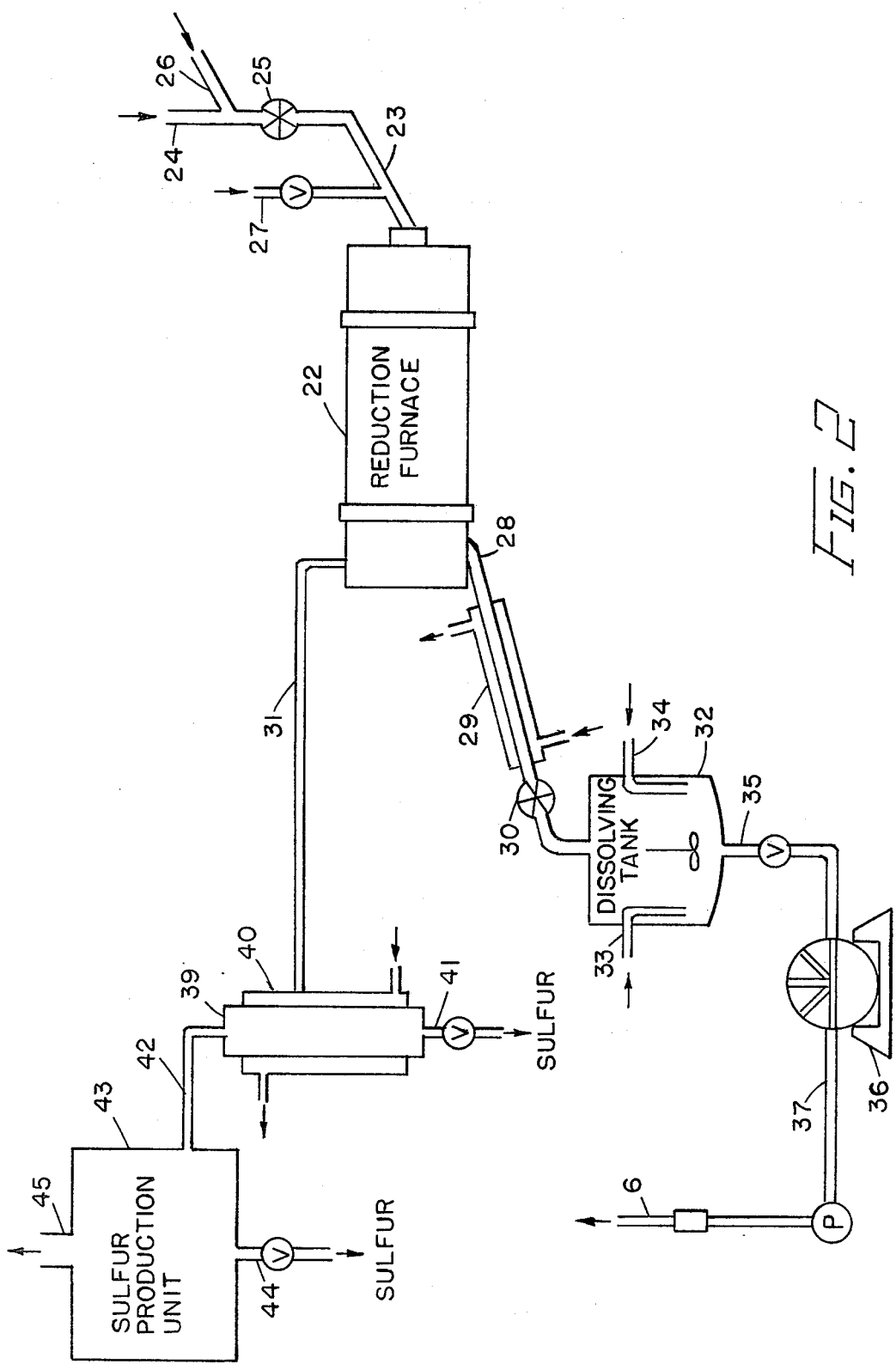

The invention in a preferred aspect is further illustrated by the drawings, wherein:

FIG. 1 represents apparatus, shown largely in schematic vertical section, for performance of the scrubbing, oxidizing and dehydrating steps; and FIG. 2 represents in similar manner apparatus for performance of the sulfate reduction, scrubbing liquor regeneration, sulfur dioxide-hydrogen sulfide interreaction, and sulfur recovery steps.

In the figures, the same numbers designate the same components.

In FIG. 1, the towers for performance of the scrubbing, sulfite oxidation, and dehydration steps are respectively identified by reference numerals 1, 2 and 3.

Scrubbing tower 1 is provided at its base with duct 4 for admission of the flue gas to be purified, and at its top with duct 5 for discharge of the scrubbed and thereby purified flue gas. Scrubbing solution supply pipe 6 ending in sprayhead 7 enters tower 1 centrally, near the top, and permits the scrubbing solution to be sprayed uniformly downwardly through the tower against a rising current of flue gas therein. The bottom of tower 1 is provided with spent scrubbing solution transfer pipe 8 for conveying spent scrubbing solution to tower 2 for oxidation of the sulfite content thereof.

Sulfite oxidizing tower 2 is provided at its bottom with sparger 9, through which is admitted spent scrubbing solution from tower 1, compressed air inlet pipe 10 ending in sparger 11 adapted to release air in the form of fine bubbles in the tower, and sparger 13, through which is admitted catalyst solution supplied by pipe 12. Exhaust duct 14 at the top of tower 2 is provided for venting the air which bubbles up through the scrubbing solution. Near its top, tower 2 is provided with overflow discharge pipe 15 for conveying to dehydrator 3 oxidized solution which has risen to the top of tower 2.

Dehydrator tower 3 is provided at its top with sprayhead 16, which is adapted to spray overflow solution transferred from tower 2 through pipe 15 downwardly into tower 3, and with vent 17 for discharge of spent heating gas and the water evaporated thereby. Near its bottom, tower 3 is provided with drying gas distribution head 19 supplied from duct 18. The base of the tower is provided with vertical product discharge pipe 20 containing optional rotary vapor lock 21 adapted to permit the dry product to be discharged from the tower without permitting more than a negligible quantity of the heating gas to escape.

In FIG. 2, rotary reduction furnace 22 is provided at its inlet end with main feed supply pipe 23 into which lead product supply pipe 24 containing rotary gas lock 25 and carbonaceous reducing agent supply pipe 26 and compressed air supply pipe 27. At its outlet end furnace 22 is provided with solids discharge pipe 28 (provided with cooling jacket 29 and rotary vapor lock 30), and with gas discharge pipe 31. Solids discharge pipe 28 is adpated to convey by gravity the cooled solid reduction product of furnace 22 into continuous dissolving tank 32 provided with makeup water inlet pipe 33 and with makeup sodium hydroxide solution inlet pipe 34. At its bottom, tank 32 is provided with regenerated scrubbing solution discharge line 35 containing continuous rotary vacuum drum filter 36 adapted to remove fly ash and any other particulate solids present in the discharge. Filter discharge line 37 connects with pipe 6 (FIG. 1) and permits the filtered regenerated scrubbing solution to be returned to scrubbing tower 1, thereby completing the cycle.

Gas discharge pipe 31 conveys the gaseous mixture formed in furnace 22 to cooling tower 39 provided with cooling jacket 40 adapted to selectively condense elementary sulfur from the gas. Bottom discharge line 41 permits the condensed sulfur to drain from the tank. Gas transfer pipe 42 transfers the residual non-condensed gas from tower 39 into sulfur production unit 43 adapted to inter-react the hydrogen sulfide and the sulfur dioxide in the gas with formation of elemental sulfur. Bottom pipe 44 is adapted to drain the liquid or molten sulfur formed in the unit, and upper vent 45 carries off the mixture of residual gases.

The gas exhaust ducts in the system are provided with demisters and dust removers as may be required to prevent escape of droplets of scrubbing solution and sulfate dust. Any raw flue gas used in the process for heating or other purpose is ducted to the scrubbing tower for removal of the sulfur dioxide therein.

In a preferred embodiment of the invention, as applied to a power plant using high sulfur coal, the flue gas from the plant to which air has been added to enrich the oxygen content thereof and thereby improve its effectiveness as oxidizing agent for sulfites, is admitted at a temperature of 250° F. into the bottom of a scrubber tower, and an aqueous scrubbing solution containing 15% by weight (total solids basis) of a 1.1:1 $Na_2O:Al_2O_3$ equivalent molar ratio $NaOH:NaAlO_2$ mixture (4:82 weight ratio) is admitted into the tower at 120° F. as a spray from a spray-head at the top thereof. The off-gas from the top of the tower is monitored for its sulfur dioxide content, and the volume of the spray is varied until the amount of sulfur dioxide in the gas falls below local emission limits. With scrubbing solution admitted at this rate, the underflow from the tower contains substantially no sodium hydroxide and sodium aluminate, and a part of the sulfites formed by the reaction are oxidized to sulfates.

The underflow from the scrubbing tower consists essentially of an aqueous solution of sodium and aluminum sulfates and sodium sulfite, with aluminum sulfite present as a dispersed precipitate, together with the fly ash present in the entering flue gas. The underflow is pumped into the bottom of an oxidizing tower which is filled nearly to its top with previously transferred spent scrubbing solution. A stream of aqueous ferric sulfate solution as oxidation catalyst is pumped through a sparger into the bottom of the tower at a rate which provides 0.33% of iron based on the weight of sulfur dioxide being removed, and air in the form of fine bubbles is also introduced into the bottom of the tower through a sparger. Substantially all of the sulfite content of the scrubbing solution is oxidized to sulfates as the solution rises through the tower, and the air admitted into the solution, minus the oxygen content thereof which has reacted, is vented from the top of the tower.

Oxidized scrubbing solution is continuously withdrawn from the top of the oxidation tower and is transferred to any commonly used apparatus for dehydrating liquids, for example a spray drier or a drum drier. When a spray drier is employed, the solution is sprayed downwardly from the top of the tower against a rising current of hot air (heated by indirect contact with raw flue gas). The rate at which the solution is sprayed into the tower and the temperature and volume of the drying air are correlated so that the solids in the scrubbing solution are deposited on the bottom of the tower in apparently dry state but with the sulfates containing a suitable amount of water of hydration to supply reactive hydrogen as needed in the reduction step, when the reduction is performed in an adjacent furnace. More extensive dehydration is performed when the product is to be shipped for further processing.

In either event, the further processing is performed by charging the product into a reducing furnace along with coal and air (pre-heated if desired) in such amounts that a combustion temperature of about 1,000° C. is maintained in the furnace, producer or water gas ($CO + H_2$) is formed in sufficient amount to convert substantially all the sodium sulfate and aluminum sulfate present into sodium aluminate and sodium oxide, and to provide a sufficient amount of reactive (i.e., molecular) hydrogen to convert the sulfur content of these sulfates into hydrogen sulfide and sulfur dioxide in about 2:1 molar ratio.

In certain instances it may be convenient to remove all of the free water present in the oxidized scrubbing solution and only a small amount (less than 20%) of the bound water of the spent absorbent. In this state of dehydration the product discharged from the dehydrator unit exists in a molten state and therefore can be pumped into the reduction furnace. However, it is generally preferable to continue the dehydration so that about ¾ of the normal water of hydration is removed. In this range the product usually contains a sufficient quantity of water to form an effective reducing amount of water gas during the reduction step but not so much that the product cannot be shipped economically to a central chemical processing plant, and the product can be in free-flowing particulate state.

The underflow from the furnace (a solid mixture of sodium aluminate, sodium oxide, and possibly fly ash and catalyst residue) is preferably cooled to prevent undue evolution of steam in the next step. In that step the cooled product is charged into a continuous dissolver, and make-up sodium hydroxide solution is added as required.

The resulting solution is filtered to remove insolubles, cooled as necessary, and recycled to the scrubbing tower.

The gaseous discharge from the reducing furnace is composed chiefly of hydrogen sulfide, sulfur dioxide, elementary sulfur, and combustion gas residues. The gaseous stream is passed through a continuous cooler where the sulfur is selectively condensed to a liquid, and the residual gas is passed into a sulfur producing unit for conversion of the hydrogen sulfide and the sulfur dioxide to sulfur and water by the Claus process. The sulfur produced is condensed to liquid form and is combined with the sulfur from the first condenser.

In the oxidizing step, hydrogen peroxide and ozone can be used as the oxidizing agent, each alone or in admixture with oxygen.

In the reducing step, the carbonaceous matter used (particularly in the case of bituminous coal and fuel oil) may by itself contain hydrogen for formation of the necessary amount of hydrogen sulfide, thus making supplementary addition of water of hydration or other source of hydrogen unnecessary.

I claim:

1. A mixture consisting essentially of sodium sulfate and aluminum sulfate in about 1.1:1 to 2:1 $Na_2O:Al_2O_3$ equivalent molar ratio.

2. A mixture according to claim 1 wherein said sulfates contain about $\frac{1}{4}$ of their normal water of hydration and said mixture is apparently dry and free-flowing.

3. A process for preparing a mixture of sodium aluminate and sodium oxide from a mixture consisting essentially of sodium sulfate and aluminum sulfate in 1:1 to 2:1 $Na_2O:Al_2O_3$ equivalent molar ratio, which comprises heating said mixture at a reducing temperature with a carbonaceous reducing agent in the presence of reactive hydrogen.

4. A process according to claim 3 wherein said heating and said supply of carbonaceous reducing agent is continued until substantially all of said sodium sulfate and said aluminum sulfate has been reduced.

* * * * *